No. 723,889. PATENTED MAR. 31, 1903.
J. McC. LORD.
HORSESHOE PAD.
APPLICATION FILED SEPT. 23, 1901.
NO MODEL.
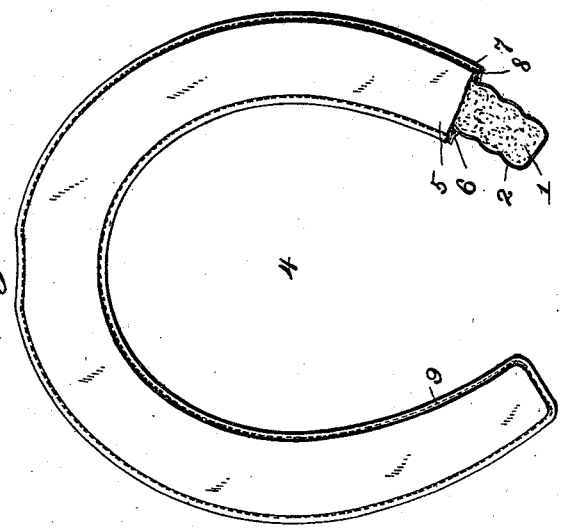
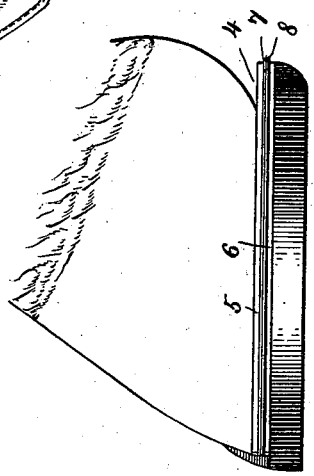
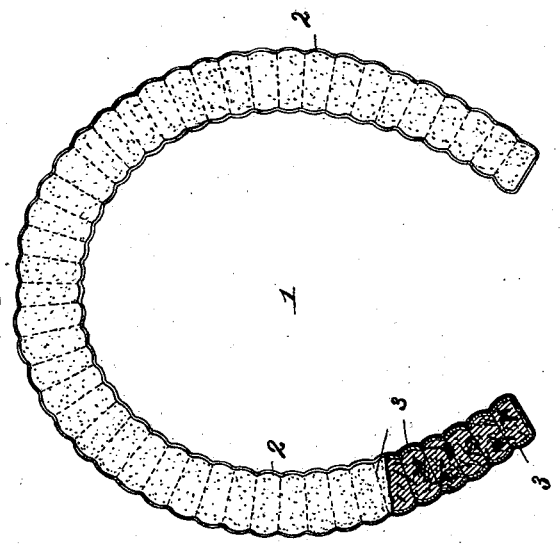
Witnesses:
Arthur McArthur.
H. C. Rodgers.
Inventor:
J. McC. Lord
By Fischer & Sharpe
Attys.

UNITED STATES PATENT OFFICE.

JOHN McC. LORD, OF KANSAS CITY, MISSOURI.

HORSESHOE-PAD.

SPECIFICATION forming part of Letters Patent No. 723,889, dated March 31, 1903.

Application filed September 23, 1901. Serial No. 76,212. (No model.)

*To all whom it may concern:*

Be it known that I, JOHN McC. LORD, a citizen of the United States, residing at Kansas City, in the county of Jackson and State of Missouri, have invented certain new and useful Improvements in Horseshoe-Pads, of which the following is a specification.

My invention relates to horseshoe-pads; and my object is to provide a cushion composed, preferably, of cork or similar resilient material which I interpose between the hoof and shoe to prevent concussion and its consequent damage to a horse when traveling over a hard road, thus conducing to his comfort, general health, and usefulness. My preference for cork to rubber or similar material is because not only of its imperviousness to water and extreme lightness, but of its non-conducting qualities, which render it possible for a horse to speed over a hard road without injury to the hoof from the heating of the shoe caused by its rapid pounding against the surface of the road. Another advantage obtained by interposing a pad between the hoof and shoe is that it removes all irritation resulting from the contact of the shoe with the hoof, and if the latter be sore and tender it will have a healing effect thereon.

The invention may be said to consist of a core composed of cork or similar material, bound by a retaining-strip and inclosed in a protecting-covering to prevent its spreading or disintegrating when in use.

Referring now to the accompanying drawings, Figure 1 represents a plan view of the core, partly in section. Fig. 2 is a plan view of the complete pad with part of the outer covering removed to show the position of the core. Fig. 3 shows the pad in position between the hoof and the shoe.

Referring to the drawings by numbers, 1 indicates a core of suitable material cut out to conform to the general shape of a horseshoe and made in various sizes to correspond with different shoes with which it may be employed. To prevent the core from spreading when in use, I provide an endless retaining-strip 2, consisting, preferably, of leather, which is secured to the vertical walls of the core by stitching 3, a part of which extends transversely through the core and assists the retaining-strip in holding the core in its proper shape. After the retaining-strip has been sewed to the core the latter for further protection is inclosed in a covering 4, consisting of two strips 5 5, preferably composed of leather and of the same shape as the core, only somewhat larger, to provide overlapping edges 7 8, firmly secured together by continuous stitching 9. For light work the outer covering may be dispensed with, as the retaining-strip will be sufficient to hold the core in its proper shape. The completed pad is now ready for use and may be put on by the blacksmith when he shoes the hoofs of the horse.

Having thus described my invention, what I claim as new, and desire to secure by Letters Patent, is—

1. A horseshoe-pad, composed of cork, and a retaining-strip sewed to the vertical walls thereof, substantially as described.

2. A horseshoe-pad, consisting of a suitable core, a retaining-strip sewed to the vertical walls thereof, and a covering to receive the core, substantially as described.

In testimony whereof I affix my signature in the presence of two witnesses.

JOHN McC. LORD.

Witnesses:
H. C. RODGERS,
G. Y. THORPE.